United States Patent [19]

Valster et al.

[11] Patent Number: 4,956,914

[45] Date of Patent: Sep. 18, 1990

[54] METHOD OF MAKING WING PULLEYS

[75] Inventors: Karl C. Valster; Allen V. Reicks, both of Pella, Iowa

[73] Assignee: Precision Pulley, Inc., Pella, Iowa

[21] Appl. No.: 454,428

[22] Filed: Dec. 21, 1989

[51] Int. Cl.$^5$ ............................................. B21K 1/42
[52] U.S. Cl. ................................. 29/892.1; 474/185
[58] Field of Search ............ 29/159 R; 474/184, 185, 474/186

[56] References Cited

U.S. PATENT DOCUMENTS

| | | | |
|---|---|---|---|
| 3,046,805 | 7/1962 | Van Gorp | 29/451 |
| 3,055,229 | 9/1962 | Mecham | 198/835 |
| 3,138,963 | 6/1964 | Prince | 29/159 R |

Primary Examiner—P. W. Echols
Attorney, Agent, or Firm—Henderson & Sturm

[57] ABSTRACT

A method of making a wing pulley using a plurality of substantially identical building block segments. These building block segments are generally U-shaped with a tapering configuration from one end to the other. A predetermined number of the building block segments are welded together to form a first rigid annular subassembly and a second identical number of predetermined building block segments are also welded together to form a second rigid annular subassembly. A hub is attached to the outer end of each of the rigid annular subassemblies so that bushings or other attachments can be made for rotatably mounting the wing pulley in a conventional manner.

8 Claims, 3 Drawing Sheets

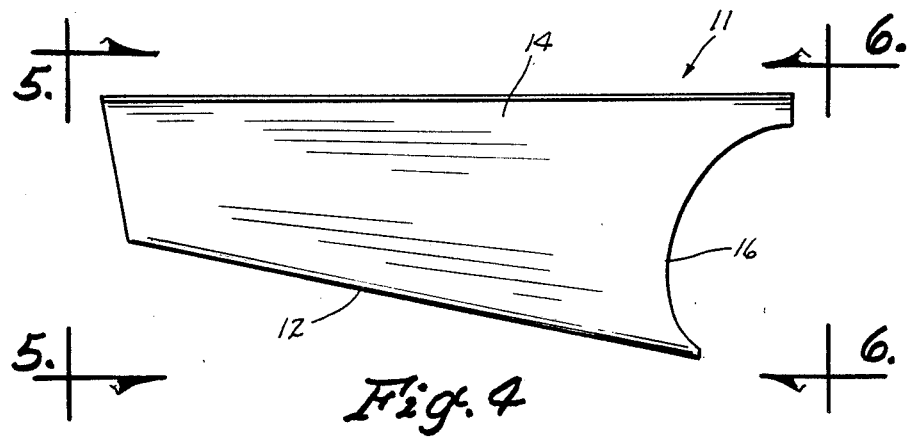
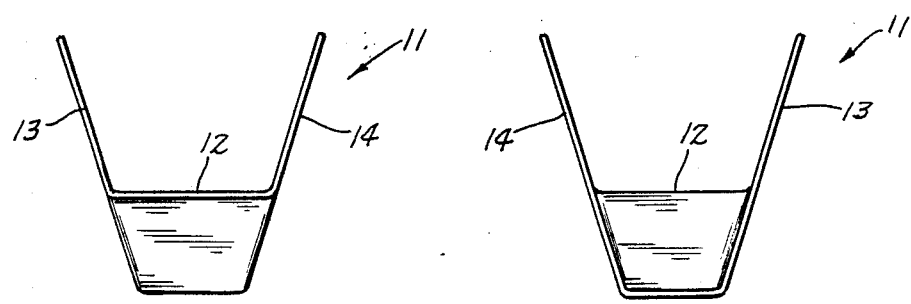
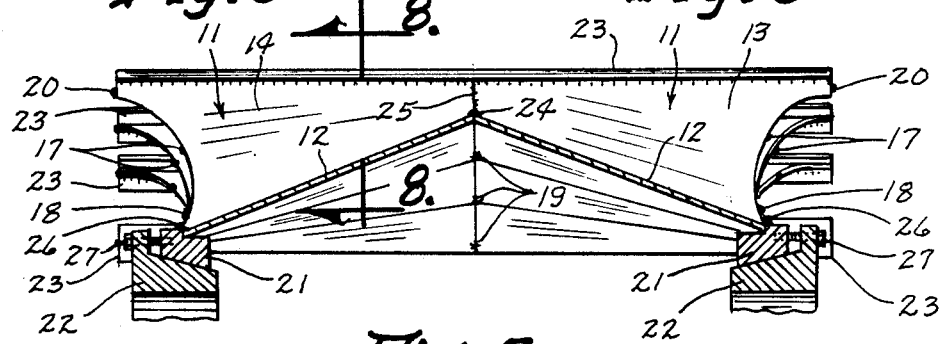
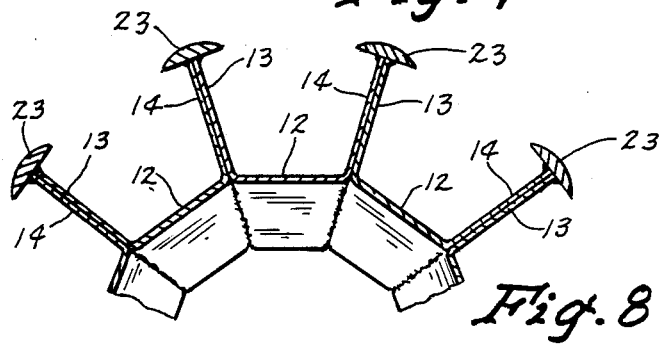

4,956,914

METHOD OF MAKING WING PULLEYS

TECHNICAL FIELD

The present invention relates generally to a method for making wing pulleys and more particularly to such a method which minimizes the amount of welding and assembly time required to make wing pulleys.

BACKGROUND ART

Belt conveyors typically permit some of the conveyed material to fall on the inner surface of the lower stretch of the belt and some of this material will usually find its way onto one of the end pulleys and be drawn between the belt and the pulley surface. Since this can damage the belt and cause the system to malfunction, self-cleaning conveyor belt pulleys of the type shown in U.S. Pat. No. 3,046,805 have been devised.

Self-cleaning conveyor belt pulleys are typically constructed of numerous metal parts which must be stamped out or cut out and then welded together. This is a very time consuming and labor intensive process, thereby making this type of pulley more expensive to produce than some other types. Another problem with prior art wing pulley devices is that the parts used therein are of significantly different dimensions for each size of pulley.

U.S. Pat. No. 3,055,229 to Mecham attempts to address the aforementioned problem by utilizing somewhat Z-shaped building block segments to construct a self-cleaning conveyor belt pulley. The Mecham invention, which was patented in 1962, has not become a commercially successful invention and it is surmised that the reason that the major pulley manufacturers do not use this method of constructing self-cleaning conveyor belt pulleys is because it requires long welds across the pulley in difficult to reach places, thereby not fully achieving the desired result of minimizing the amount of welding and assembly time necessary to produce a cheaper, yet dependable self-cleaning conveyor belt pulley. Another problem with prior art self-cleaning conveyor belt pulleys is that there have been no building block segments devised which are universal enough to apply to make pulleys of different sizes and lengths without major modifications to each building block segment.

Accordingly, there is a need for a process for making self-cleaning conveyor belt pulleys whereby a more universal building block segment can be utilized to decrease the amount of welding and assembly time to produce self-cleaning conveyor belt pulleys of various sizes.

DISCLOSURE OF THE INVENTION

The present invention relates to a method of making a wing pulley using a plurality of substantially identical building block segments. These building block segments are generally U-shaped with a tapering configuration from one end to the other. A predetermined number of the building block segments are welded together to form a first rigid annular subassembly and a second identical number of predetermined building block segments are also welded together to form a second rigid annular subassembly. A hub is attached to the outer end of each of the rigid annular subassemblies so that bushings or other attachments can be made for rotatably mounting the wing pulley in a conventional manner.

Contact bars are attached to the wings formed by the two subassemblies for contacting a conveyor belt. Different numbers of building block segments can be utilized to produce wing pulleys corresponding to the number of wings desired thereon.

Also, if it is desired to make a wing pulley of a certain width, the length of the building block segments can be chosen at a particular length by merely cutting off a portion of the standard length of metal shown in FIG. 2.

An object of the present invention is to provide an improved method of making wing pulleys.

Another object of the present invention is to provide a method of making wing pulleys which uses a universal tooling design which can be used to make wing pulleys of various predetermined widths and diameters.

A further object of the present invention is to provide a method of making a wing pulley which is universal, and which eliminates much of the welding and assembly time necessary for constructing prior art wing pulleys.

Other objects, advantages, and novel features of the present invention will become apparent from the following detailed description of the invention when considered in conjunction with the accompanying drawings.

BRIEF DESCRIPTION OF THE DRAWINGS

FIG. 4 is a side elevational view taken along line 4—4 of FIG. 3;

FIG. 5 is a view of the building block segment taken along line 5—5 of FIG. 4;

FIG. 6 is a view of the building block segment taken along line 6—6 of FIG. 4;

FIG. 7 is a cross sectional view take along line 7-7 of FIG. 1;

FIG. 8 is an enlarged partial cross sectional view taken along line 8—8 of FIG. 7;

BEST MODE FOR CARRYING OUT THE INVENTION

Figure 1:
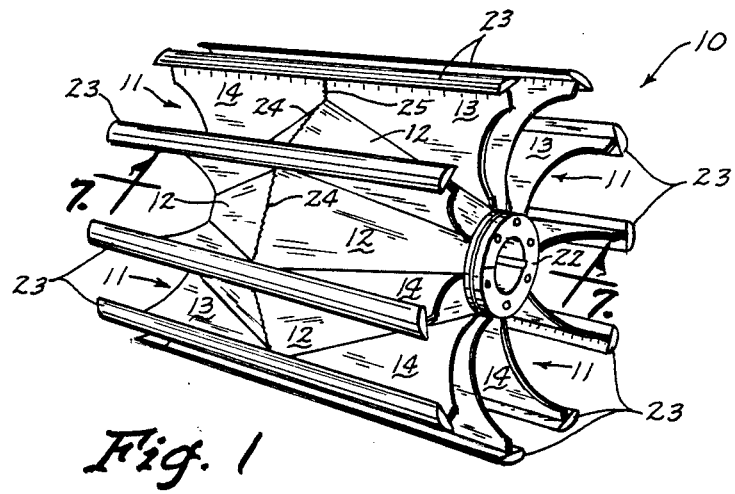
FIG. 1 is a perspective view of a preferred embodiment constructed in accordance with the present invention.
Figure 2:
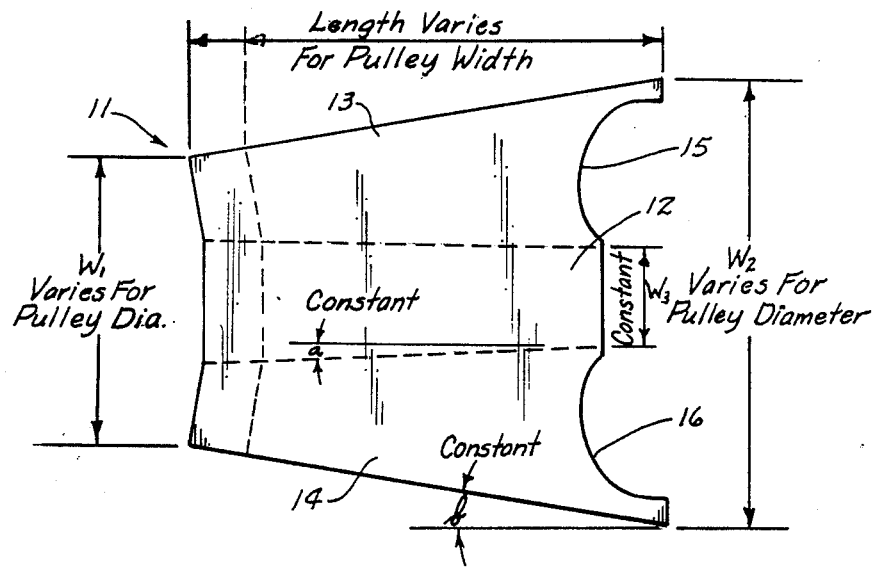
FIG. 2 shows one of the building block segments after it has been stamped out and before it is bent into a standard building block segment shape.
Figure 3:
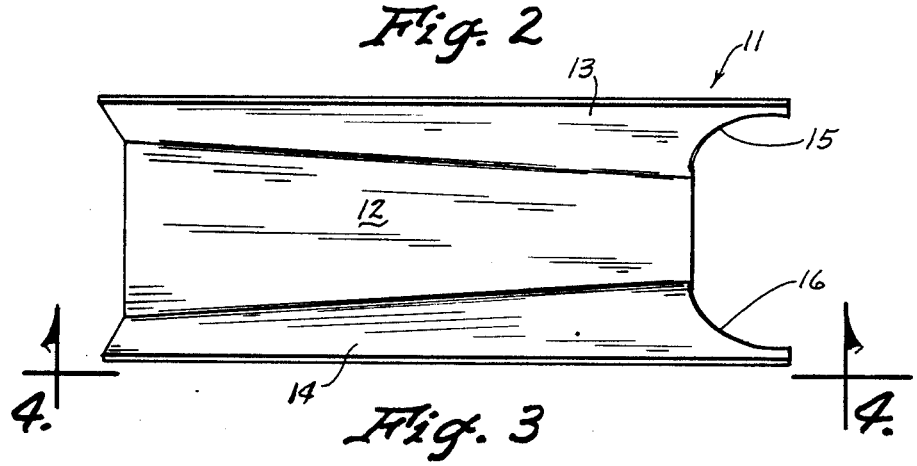
FIG. 3 is a top view of a building block segment of FIG. 2 after two of the three panels thereof have been bent into its final shape.

Referring now to the drawings wherein like reference numerals designate identical or corresponding parts throughout the several views, FIG. 1 shows a wing pulley (10) constructed by the method of the present invention. FIG. 2 shows a flat, stamped out or cut out of metal sheet (11) which is the beginning of the building block segment (11) shown in FIGS. 2-6. This flat blank segment (11) shown in FIG. 2 can be trimmed in length, depending upon how wide or long the pulley

(10) is desired to be constructed. It is noted that the term width is used in connection with the width of the blank (11) shown in FIGS. 2 and 3. Pulleys, such as pulley (10) shown in FIG. 1, are referred to in the pulley field as having a width instead of a length. For example, the width of pulley (10) would correspond to the length of contact bars (23) shown in FIG. 1.

Once the length has been determined and the appropriate amount to the left of the mostly vertical dashed lines shown in FIG. 2 has been cut off, then the blank segment (11) is bent along the mostly horizontal lines shown in FIG. 2 to form a first gusset panel (12), a second panel (13) and a third panel (14). Each of these panels (12), (13) and (14) are preferably flat. The outer ends (15) and (16) of the second and third panels (13) and (14), respectively, are cut out in somewhat of an arc for reasons which will be discussed below. The width W1, on the inner end of the blank segment (11) shown in FIG. 2, and W2, the width of the outer end of the blank segment (11) before it is bent, can be adjusted to change the desired pulley diameter. As will be explained below, there are numerous sizes and diameters of wing pulleys which can be constructed from a blank segment (11) which has constant width W3. The two angles (a) and (b) which are maintained as constant angles for each tooling "package" (11).

Once the standard building block segments (11) shown in FIGS. 2-6 have been bent from the blank segment (11) shown in FIG. 2, two identical subassemblies (28) are constructed using these building block segments (11). Referring to FIG. 7, one of the subassemblies (28) would be to the left of the vertical center line and one of the subassemblies (28) would be to the right of the vertical center line. These subassemblies (28) are constructed by clamping adjacent panels (13) and (14) together by fixtures (not shown) to hold them substantially in the position shown in FIGS. 1, 7 and 8.

Figure 10:
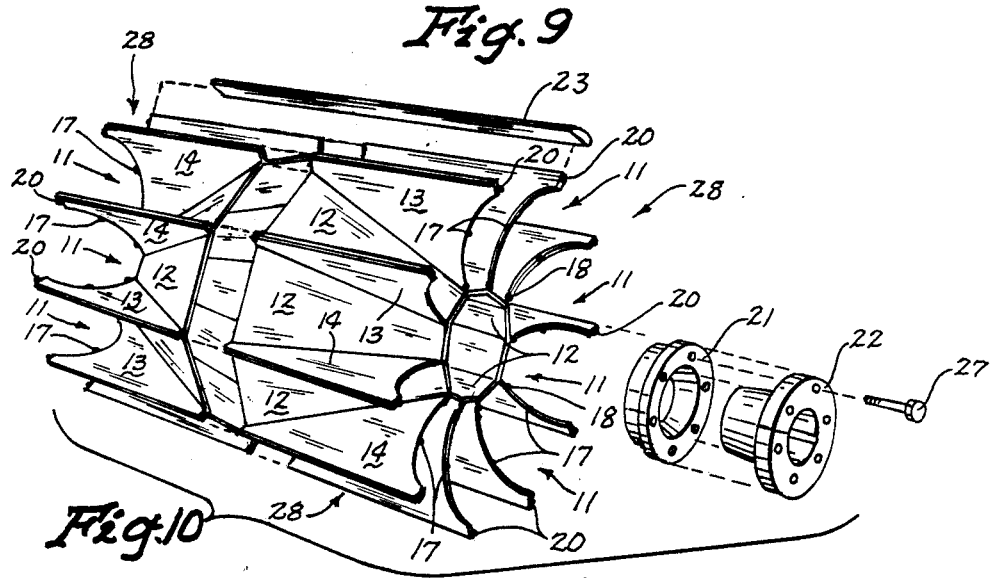
FIG. 10 is an exploded view of the wing pulley of FIG. 1 showing the two subassemblies before they are welded together and with the contact bars, hubs and bushings projected outwardly therefrom.

Once the subassembly (28) to the left of center, as shown in FIGS. 7 and 10, is so positioned, then typically tack welds (17), (18), (19) and (20) on each of the subassemblies (28) can be made to hold the adjacent panels (13) and (14) together as well.

Once two of these subassemblies (28) has been constructed, the inner ends are placed in the position shown in FIG. 1 before the hubs (21), bushings (22) and contact bars (23) are placed in position. The inner ends of the panels (12) are then welded along the contact line (24) and, optionally, welds (25) are made to connect the inner ends of abutting panels (13) and (14), all the way around the wing pulley (10).

Figure 9:
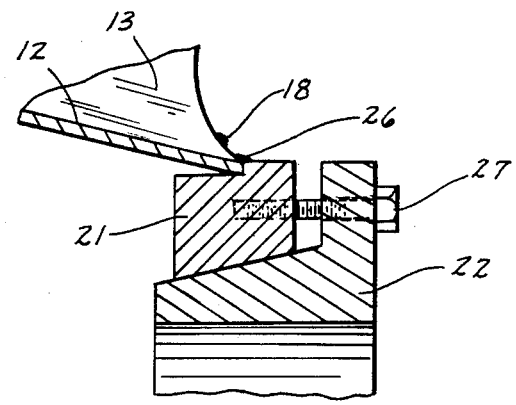
FIG. 9 is an enlarged cross sectional view showing the detail of how the hub and bushing are connected to the wing pulley, taken along line 7—7 of FIG. 1.

The hubs (21) are then placed in the position shown in FIGS. 7 and 9 and a weld (26) is made completely, 360 degrees around, to connect the hub (21) to the extreme outside portion of panels (13) and (14). By providing the cut out portions (15) and (16), access to make the weld (26) is easily provided, and an improved stress flow is provided. This arrangement also increases the speed at which the weld (26) can be made.

Contact bars (23) can then be welded to the wings formed by abutting panels (13) and (14). As an alternative, these contact bars (23) can be half as long as that shown in FIG. 7 and then each one of the contact bars (23) would be connected to each subassembly (28) before the subassemblies (28) are welded together, at which time the shorter contact bars (23) would also be welded together. The bushings (22) can be bolted onto the hubs (21) by bolts (27) at a later time, for permitting the wing pulley (10) to be mounted on a shaft (not shown).

The particular preferred embodiment (10), shown in FIG. 1, has ten wings, having a contact bar (23) welded to the extreme outside of each one. This particular wing pulley (10) shown is constructed of two identical subassemblies (28) which are each constructed of ten of the building block segments (11) shown in FIGS. 3-6. It will be understood that pulleys of a wide range of sizes and numbers of wings can be provided with tooling packages, each with different constant values of W3, (a) and (b). To add to the versatility of the method of the present invention, it will be noted by reference to FIG. 2 that the length of the standard blank segment (11) can also be varied to produce the desired width of wing pulley while still using the basic standard blank segment (11) configuration.

Figure 11:
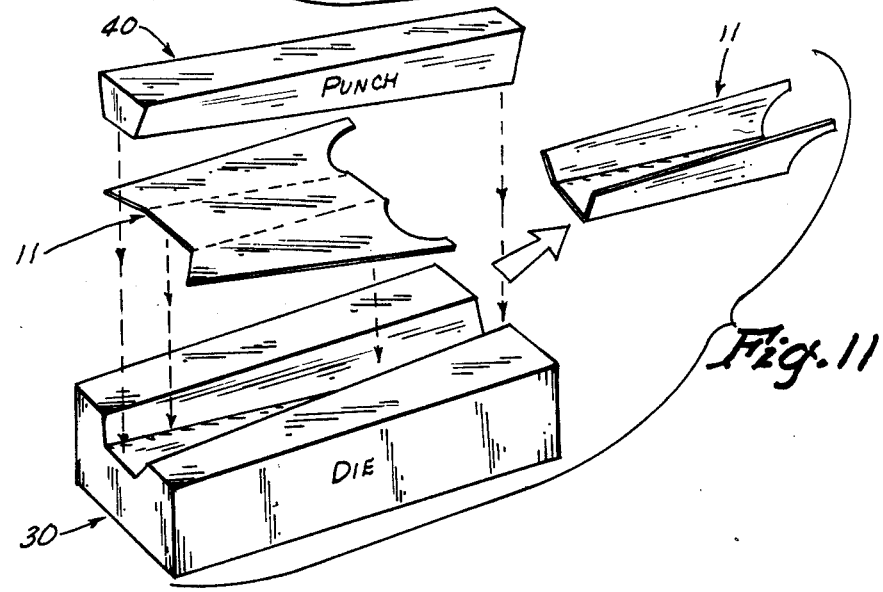
FIG. 11 shows a perspective view of a building block segment of a variable but predetermined length being bent from the FIG. 2 flat shape to the FIGS. 3-6 bent shape.

Furthermore, gusset panel (12) can be bent into shape from blank (11) by a punch (40) and universal die (30) as shown in FIG. 11 or the gusset panel (12) can be formed from a universal blank die (not shown), and the parts merely welded together. Either method permits a standard universal die to be used as contrasted from prior art methods which use a different die for each different size and width of wing pulley.

Accordingly, it will be appreciated that the method of constructing wing pulleys described above does indeed accomplish the aforementioned objects. Obviously many modifications and variations of the present invention are possible in light of the above teachings. It is therefore to be understood that, within the scope of the appended claims, the invention may be practiced otherwise than as specifically described.

We claim:
1. A method of making a wing pulley using a plurality of substantially identical building block segments, said building block segments comprising:
   a first panel disposed at least generally in a first plane, said first panel having a first edge, a second edge, an outer end and an inner end, said first panel being wider at the inner end than at the outer end thereof;
   a second panel disposed at least generally in a second plane, said second panel having a first edge connected to said first edge of said first panel and a second edge, an outer end and an inner end; and
   a third panel disposed at least generally in a third plane, said third panel having a first edge connected to the second edge of said first panel, a second edge, an outer end and an inner end;
   said method comprising:
   connecting together a predetermined number of said building block segments to form a first rigid annular subassembly by connecting the second panel of each building block segment to the third panel of each adjacent building block segment whereby said first annular subassembly extends a full 360 degrees, said first rigid annular subassembly having an outer end and an inner end;
   connecting together a second rigid annular subassembly from said predetermined number of said building block segments by rigidly connecting the second panel of each building block segment of said second annular subassembly to the third panel of each adjacent building block segment of said second rigid annular subassembly whereby said second annular subassembly is substantially identical to said first annular subassembly, said second rigid annular subassembly having an outer end and an inner end;

rigidly connecting said inner ends of said first and second rigid annular subassemblies together in a relationship whereby the second and third panels of said first rigid annular subassembly are generally in the same plane as corresponding third and second panels respectively of said second rigid annular subassembly;

rigidly attaching a hub to the outer end of said first rigid annular subassembly; and rigidly attaching a hub to the outer end of said second rigid annular subassembly.

2. The method of claim 1 including rigidly attaching the inner ends of the first panels of said first rigid annular subassembly to respective adjacent inner ends of the first panels of said second rigid annular subassembly.

3. The method of claim 1 including cutting said building block segment from a flat sheet of metal and bending said second and third panels with respect to said first panel whereby said building block segment is constructed in one piece.

4. The method of claim 1 wherein adjacent ones of said building block segments are welded together at the outer ends thereof before the first and second subassemblies are connected together.

5. The method of claim 4 wherein said building block segments are welded together at the inner ends thereof before said first and second subassemblies are connected together.

6. The method of claim 1 including the step of welding a contact bar on the second edge of each adjacent second and third panel whereby the contact bar can contact a conveyor belt when the finished wing pulley is in operation.

7. The method of claim 6 wherein said contact bar is connected to said second edge of said second and third panels after said first and second subassemblies are connected together.

8. The method of claim 1 wherein ten building block segments are used to form said first subassembly and ten more building block segments are used to form said second subassembly.

* * * * *